W. G. STEWART.
SHAPER GUARD.
APPLICATION FILED MAR. 31, 1909.
955,482.
Patented Apr. 19, 1910.
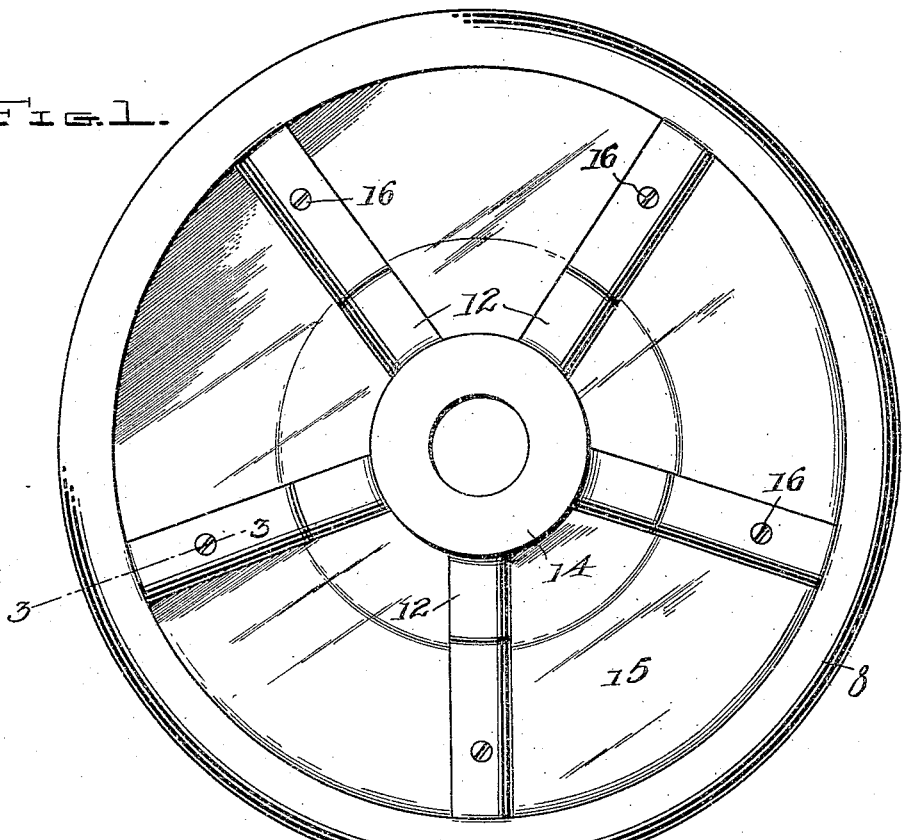
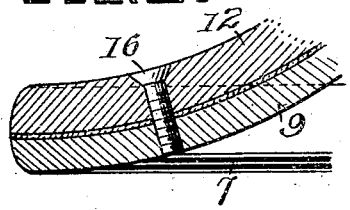
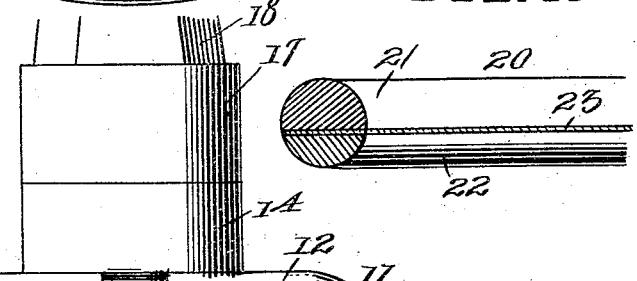
Witnesses
Inventor
Walter G. Stewart
By Victor J. Evans
Attorney

UNITED STATES PATENT OFFICE.

WALTER G. STEWART, OF ALLENTOWN, PENNSYLVANIA.

SHAPER-GUARD.

955,482.   Specification of Letters Patent.   Patented Apr. 19, 1910.

Application filed March 31, 1909. Serial No. 486,959.

*To all whom it may concern:*

Be it known that I, WALTER G. STEWART, a subject of the King of Great Britain, residing at Allentown, in the county of Lehigh and State of Pennsylvania, have invented new and useful Improvements in Shaper-Guards, of which the following is a specification.

This invention relates to guards for cutter heads or similar shaping apparatus, and has for an object to provide a cutter with a novel and simple form of guard disposed directly above the cutting knives and provided with transparent material adapted to prevent, in operation of the cutter, flying splinters or pieces of material from coming in contact with the operator, or from flying in his eyes, thus obviating injury to the operator when the cutter is in operation.

A still further object of my invention is to provide a cutter guard of the character described provided with transparent material disposed immediately above and adjacent to the cutting knives and to construct the guard in such manner that in operation thereof a current of air will be created immediately above the cutting knives to allow waste and cutting material and chips to be blown without the aid of the operator off of the table upon which the cutter is mounted.

Another object of my invention resides in the peculiar construction of the guard wherein when molding is in its correct position with respect to the cutting knives a comparatively small space will be provided between the upper surface of the molding and the lower peripheral edge of the guard itself which will effectively obviate the entrance of the fingers of the operator beneath the guard and prevent the fingers from coming in contact with the cutting knives.

A further object of my invention is to provide a novel form of cutter provided with means which will readily permit the operator to remove an old or worn piece of transparent material and replace by a new piece.

Other objects and advantages will be apparent as the nature of the invention is better set forth, and it will be understood that changes within the scope of the claims may be resorted to without departing from the spirit of the invention.

In the drawing, forming a portion of this specification and in which like numerals of reference indicate similar parts in the several views:—Figure 1 is a top plan view of the guard. Fig. 2 is a side elevation of a cutter head showing the manner of connecting the guard thereto. Fig. 3 is a detail section taken on the line 3—3 of Fig. 1. Fig. 4 is a view similar to Fig. 3 showing a slightly modified form of my invention.

Referring now more particularly to the drawing, and with particular reference to Fig. 2 thereof, there is shown a portion of a table upon which is mounted in any desired manner a cutter head 2 or similar apparatus provided with a vertical spindle 3 upon which is mounted a pair of collars 4, and between said collars a plurality of cutting knives 5 are secured.

My improved guard is illustrated at 6 and comprises a wheel embodying annular rim sections 7 and 8, the latter being somewhat thicker than the former. The section 7 is provided with a plurality of radial spokes 9 having downwardly directed portions 10, and the said spokes at their inner ends are connected to a sleeve 11 mounted upon the spindle 3. The section 8 is provided with a plurality of radial spokes 12 having downwardly and outwardly curved portions 13 similar to the portions 10 of the spokes 9. The spokes 12 are connected at their inner ends to a sleeve 14 mounted upon the spindle 3, as shown. The spokes 9 and 12 are adapted to aline with each other, and secured between the spokes and between the rim sections 7 and 8 is a piece of transparent material 15. The transparent material may be celluloid or the like providing it be somewhat flexible so that it can be secured between the rim sections 7 and 8 and the spokes 9 and 12 and conformed to their shape without having to mold or otherwise construct the material 15 into a particular design. After the transparent material has been properly placed between the rim sections and between the spokes, I pass through the spokes a plurality of retaining screws 16 which latter while not only serving to retain the transparent material in place also serve as means for holding the rim sections 7 and 8 together.

After the guard has been properly positioned upon the spindle I arrange upon the spindle a collar 17 disposed directly above the sleeve 14, and I provide the said spindle with a clamping nut 18 adapted to be engaged with the collar. When the guard is in its operative position it will be seen that the lower peripheral edge of the rim section 7 will be disposed immediately above the upper edges of the cutting knives 5 and that the outer ends of the knives will be disposed at a suitable distance inwardly of the peripheral edge of the rim section 7. A section of molding is illustrated at 19 in Fig. 2 of the drawing and it is obvious incident to the construction of the guard that a very small space will be provided between the upper surface of the molding and the lower edge of the rim section 7 which obviates or prevents the entrance of the fingers of the operator between the upper surface of the molding and the lower edge of the rim section 7 and prevents the fingers from coming in contact with the cutting knives 5.

In Fig. 4 of the drawing is illustrated a slightly modified form of my invention in which the guard 20 embodies rim sections 21 and 22 having secured therebetween transparent material 23. In this form of my invention I preferably provide a plurality of spokes arranged in a common plane to each other.

From the foregoing, it will be appreciated that I provide a novel form of guard adapted to be used in connection with shapers, cutter heads or similar cutting apparatus, providing the said guard with transparent means disposed immediately above the cutting knives, the provision of the said transparent material effectively obviating flying splinters or other material from hitting the face or body of the operator of the apparatus and also provides means allowing the operator to obtain a perfect observation of the cutting knives directly above the same. The construction of the guard, is further such that incident to the fact that the spaces between the spokes of the rim sections are closed by the provision therebetween of the transparent material air currents created during operation of the cutter or shaper will not escape upwardly from between the spokes but will be allowed to pass outwardly in a horizontal plane from the peripheral edge of the rim section 7 in such manner that cut material, such as shavings and the like will be blown from the table without the assistance of the operator.

I claim:—

1. A guard of the class described comprising companion members arranged in superimposed relation and having means adapted to be secured to the spindle of a cutter head or shaping tool and provided with transparent means adapted to be disposed immediately above the cutting knives of a cutter head or shaping tool and removably secured between the members of the said guard.

2. The combination with a cutter head or shaping tool, of a guard carried by the tool and disposed directly above the cutting knives of the said head or tool, said guard consisting of superimposed members having a plurality of spaced spokes, and transparent material removably secured between the said members and adapted to close the spaces between the spokes.

3. A cutter head provided with a plurality of cutting knives, and a guard disposed immediately above the knives and comprising superimposed members, transparent material disposed between the said members permitting observation of the knives and adapted to serve as means for preventing upward flying movement of the material cut by the knives, and means engaged with the members for holding them securely together and for holding the transparent material in its operative position.

4. A guard comprising superimposed members having annular rim portions, radial spokes carried by the members, said spokes being spaced from each other, transparent material closing the spaces between the spokes, and fastening means engaged with the members for holding them secured to each other and for holding the transparent material in its operative position.

In testimony whereof I affix my signature in presence of two witnesses.

WALTER G. STEWART.

Witnesses:
CHAS. S. ADAMS,
CHAS. W. HOOVER.